(12) United States Patent
Brooke

(10) Patent No.: US 8,009,678 B2
(45) Date of Patent: Aug. 30, 2011

(54) SYSTEM AND METHOD FOR GENERATING A DYNAMIC PRIORITIZED CONTACT LIST

(75) Inventor: Timothy Lawrence Brooke, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1347 days.

(21) Appl. No.: 11/084,463

(22) Filed: Mar. 17, 2005

(65) Prior Publication Data

US 2006/0209690 A1 Sep. 21, 2006

(51) Int. Cl.
*H04L 12/28* (2006.01)
(52) U.S. Cl. .................... 370/395.42; 370/252
(58) Field of Classification Search ............... 370/230, 370/465, 252, 395.42; 455/518
See application file for complete search history.

(56) References Cited

U.S. PATENT DOCUMENTS

| | | | | |
|---|---|---|---|---|
| 6,085,166 | A * | 7/2000 | Beckhardt et al. | 705/9 |
| 6,677,968 | B1 * | 1/2004 | Appelman | 715/853 |
| 6,968,052 | B2 * | 11/2005 | Wullert, II | 379/210.01 |
| 6,980,870 | B1 * | 12/2005 | Mok et al. | 700/90 |
| 6,990,353 | B2 * | 1/2006 | Florkey et al. | 455/519 |
| 7,139,806 | B2 * | 11/2006 | Hayes et al. | 709/207 |
| 7,143,110 | B2 * | 11/2006 | Tomari et al. | 707/104.1 |
| 7,167,910 | B2 * | 1/2007 | Farnham et al. | 709/223 |
| 7,275,215 | B2 * | 9/2007 | Werndorfer et al. | 715/752 |
| 7,284,002 | B2 * | 10/2007 | Doss et al. | 1/1 |
| 7,321,969 | B2 * | 1/2008 | Schoen et al. | 713/153 |
| 7,356,567 | B2 * | 4/2008 | Odell et al. | 709/206 |
| 7,373,181 | B2 * | 5/2008 | Vogedes et al. | 455/567 |
| 7,444,379 | B2 * | 10/2008 | Becker et al. | 709/206 |
| 7,580,363 | B2 * | 8/2009 | Sorvari et al. | 370/252 |
| 2002/0097856 | A1 * | 7/2002 | Wullert, II | 379/201.01 |
| 2003/0052915 | A1 * | 3/2003 | Brown et al. | 345/752 |
| 2003/0065721 | A1 * | 4/2003 | Roskind | 709/204 |
| 2003/0101343 | A1 * | 5/2003 | Eaton et al. | 713/170 |
| 2003/0171942 | A1 * | 9/2003 | Gaito | 705/1 |
| 2004/0059781 | A1 * | 3/2004 | Yoakum et al. | 709/204 |
| 2004/0128156 | A1 * | 7/2004 | Beringer et al. | 705/1 |
| 2004/0198427 | A1 * | 10/2004 | Kimbell et al. | 455/556.1 |
| 2005/0071435 | A1 * | 3/2005 | Karstens | 709/207 |
| 2005/0091272 | A1 * | 4/2005 | Smith et al. | 707/104.1 |
| 2005/0143111 | A1 * | 6/2005 | Fitzpatrick et al. | 455/518 |
| 2006/0004911 | A1 * | 1/2006 | Becker et al. | 709/207 |
| 2006/0069686 | A1 * | 3/2006 | Beyda et al. | 707/10 |
| 2006/0075091 | A1 * | 4/2006 | Beyda et al. | 709/224 |
| 2007/0217418 | A1 * | 9/2007 | Baker et al. | 370/392 |

* cited by examiner

*Primary Examiner* — Ricky Ngo
*Assistant Examiner* — Dewanda Samuel
(74) *Attorney, Agent, or Firm* — Merchant & Gould

(57) ABSTRACT

A system and method for generating a dynamic prioritized contact list for a communication device. The dynamic prioritized contact list may vary over the course of the day to provide an optimized contact list for a time interval. A prioritized contact list generator determines a current time interval. The prioritized contact list generator monitors communications from one or more past time intervals to determine contact priority for the current time interval. A prioritized contact list is generated for the current time interval based on the contact priority. The prioritized contact list generator automatically updates the dynamic prioritized contact list with priority changes when the current time interval expires.

12 Claims, 4 Drawing Sheets

SYSTEM AND METHOD FOR GENERATING A DYNAMIC PRIORITIZED CONTACT LIST

BACKGROUND OF THE INVENTION

Cellular telephones, personal computers, mobile computers and other computing devices are fast becoming mainstream modes for personal communication. As these modes of communication become more prevalent, so does the need for efficiency and usability of these devices. Many users of communication devices develop enormous contact lists. Currently, these contact lists are tedious to navigate, inefficiently organized and static. The inefficient organization and static behavior of current contact lists increases navigation time to find a contact and decreases the usability of the communication device.

SUMMARY OF THE INVENTION

Aspects of the present invention relate to a dynamic prioritized contact list that varies the contact list over the course of a day. In one aspect of the present invention, a communication history database is monitored to determine patterns of communication over the course of a day. A prioritized contact list generator may monitor any time increment in the communication history database. From the pattern of communication, the prioritized contact list generator may assign a priority to a contact for a time increment. Contacts with priorities may then be displayed for user accessibility. As the day progresses, the priorities may change and, therefore, the contact list may have different contacts associated therewith.

Other aspects of the present invention include monitoring a scheduler to determine contacts associated with a scheduler event. In the situation where a scheduler event is associated with a current time interval, the prioritized contact list generator may give scheduler contacts super priority over contacts based on history. In this manner, a user has the most relevant contacts in a list for accessibility and convenience.

These and other aspects will be appreciated in light of the disclosure herein.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Embodiments of a Method and System for Generating a Dynamic Prioritized Contact List Embodiments of the present invention include a system and method for generating a prioritized dynamic contact list. As referenced herein, a contact may include any identification of an outgoing communication destination or any identification of the origin of an incoming communication. The identification may include a name, telephone number, address, e-mail address, Short Messaging Service ("SMS") address, pager number, text messaging address, or any other identification that identifies the source or destination of a communication. The identification may be associated with a contact. For example, the contact may include a contact list of a telephone, cellular telephone, satellite telephone, pager, computing device, or mobile computing device. Contacts may include business contacts, personal contacts, caller identification contacts, call log contacts, SMS contacts, e-mail contacts or any other type of contact a user may facilitate for the operation of a communication device. A communication may include a telephone communication, a cellular telephone communication, an e-mail communication, a text messaging communication, a SMS communication, a pager communicate or any other type of communication that may be implemented to communication with a contact.

Figure 3:
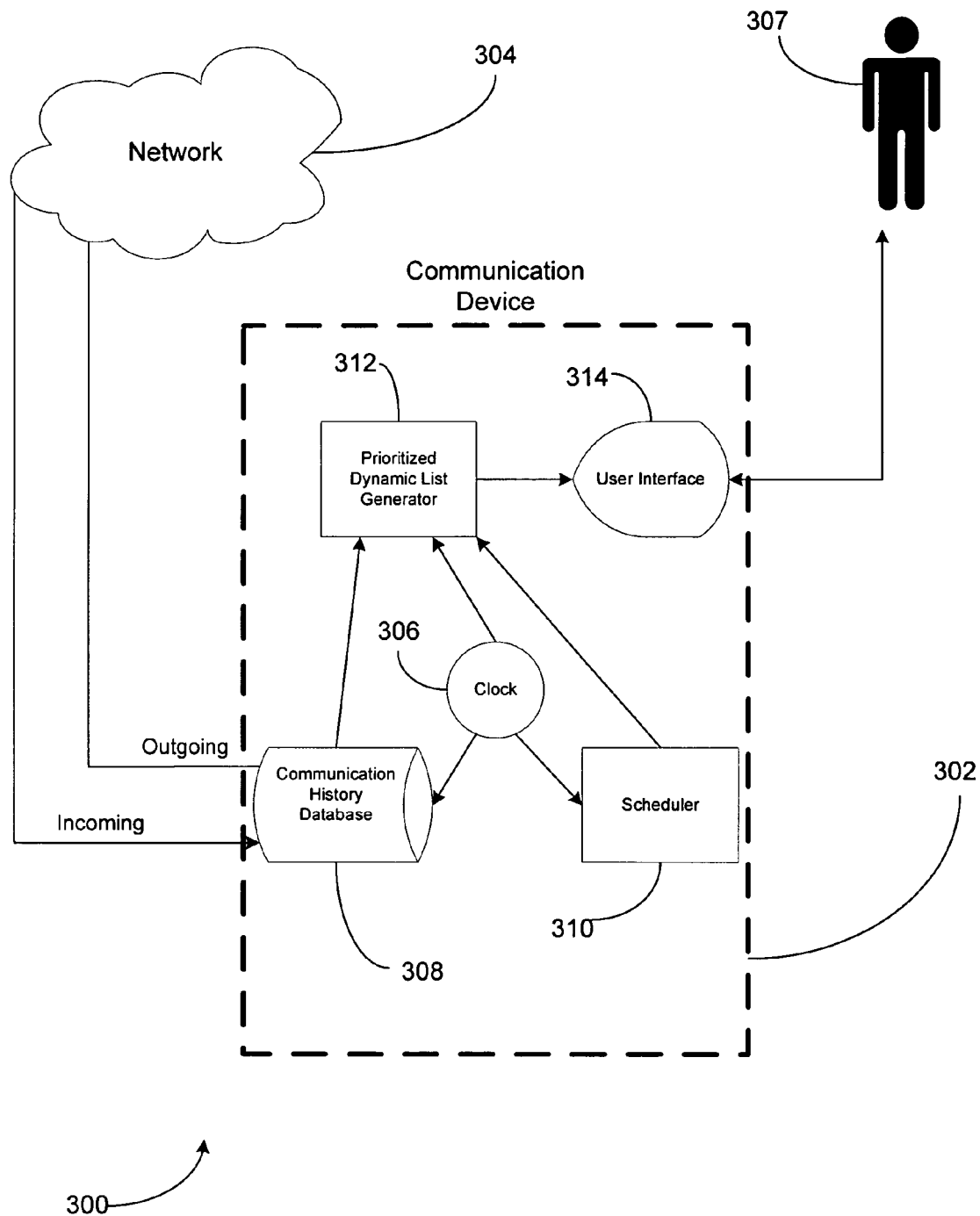
FIG. 3 represents one exemplary prioritized dynamic list generator that may be used in one embodiment of the present invention.

FIG. 3 represents one exemplary system 300 that may be used in one embodiment of the present invention. System 300 may include various configurations. For example, communication may include direct communication, indirect communication, or any combination thereof. Furthermore, databases, software or applications of a communication device may be integrated as a single application or include various applications in communication with one another.

In one embodiment, communication device 302 is in communication with a network 304. Network 304 may include any type of network that facilitates communication with communication device 302. Communication device 302 may include computing device 100 as exemplified in FIG. 1 or communication device 302 may include mobile computing device 200 as exemplified in FIG. 2. Communication device 302 may include a telephone, cellular telephone, satellite telephone, pager, stationary computing device, mobile computing device, televising device or any other device that may be used for communication purposes.

Clock 306 may keep track of the time, day, week, month and year. Clock 306 may be a single clock or a plurality of clocks associated with a plurality of applications or databases. Clock 306 identifies the time an event takes place on communication device 302. Stated another way, clock 306 allows communication device 302 to mark when an event takes place. For example, if an incoming telephone call is received, clock 306 may facilitate a time stamp to let user 307 know when the telephone call was received. As another example, clock 306 may facilitate a time stamp to let user 307 know when a meeting in a calendar will commence or end.

Communication history database 308 may include a record of prior communications. For example, communication database 308 may include a call log that keeps track of the date and time of incoming or outgoing telephone communications. Communication history database 308 may also include an inbox or outbox of an e-mail application that keeps track of incoming or outgoing e-mail communications. Communication history database 308 may include any type of database depending on the communication device and the communication type.

Scheduler 310 may include a calendar, meeting or appointment type scheduler. For example, scheduler 310 may include one or more meeting times, appointment times, important dates or anniversaries. In one embodiment, scheduler 310 includes MICROSOFT OUTLOOK from MICROSOFT CORPORATION, headquartered in Redmond, Wash. Scheduler 310 may include any type of scheduling application that is capable of associating a time with a scheduled event.

Prioritized dynamic list generator ("PDL generator") 312 may be associated with user interface 314, communication history database 308 and clock 306. PDL generator 312 monitors communication history database 308 in order to determine patterns of communications to/from a particular contact during a particular time interval. These patterns or frequency of communication may be used to determine contact priority. Priority may be calculated using a contact frequency, with the higher frequency receiving a higher priority. Priority may also be determined using a factor system, where frequency is given a weight and is only one factor of priority. For example, communication history database 308 may indicate that in the past, user 307 communicated with contacts A, B, C, D and E between the times of 5:00 pm and 6:00 pm. To determine this information, PDL generator 312 may monitor time increments of the communication history database 308. This time increment may include a day, week, month, year or any other time increment. From this information, PDL generator 312 may determine that user 307 communicated with contact A on ten occasions during a time interval, with contact B on eight occasions, with contact C on eight occasions and with contacts C and D only one time, respectively. Accordingly, PDL generator 312 may give contacts A, B and C priority during the time interval. PDL generator 312 may then generate a prioritized contact list, based on these historical patterns of communication. PDL generator 312 may then make the prioritized contact list accessible to user 307 via user interface 314.

As another aspect of PDL generator 312, PDL generator 312 may monitor patterns or frequency in a plurality of different past time increments to determine the most useful prioritized list in a current time interval. For example, communication history database 308 may indicate that during a daily time interval, contacts A, B, and C have priority Monday through Friday between 5:00 pm and 6:00 pm, as indicated above. Communication history database 308 may also indicate that during a weekly time interval, user 307 communicates with contact X every Friday between 5:00 pm and 6:00 pm. Accordingly, PDL generator 312 may give contact X priority on Friday between 5:00 pm and 6:00 pm based on the Friday communications. Likewise, PDL generator 312 may make similar priority determinations from regular monthly or yearly communications.

Yet another aspect of PDL generator 312 includes associating scheduler 310 with the PDL generator 312. Scheduler 310 may include a calendar including one or more meeting times or appointment times. Also, the appointments or meetings may have contacts associated therewith. The PDL generator 312 may monitor scheduler 310 and give contacts associated with a meeting or appointment super priority over the prioritized contacts from the communication history database 308. Alternatively, the PDL generator 312 may only give a weighted amount of priority to contacts associated with a meeting or appointment. For example, communication history database 308 may indicate that during a daily time interval, contacts A, B, and C have priority Monday through Friday between 5:00 pm and 6:00 pm. However, scheduler 310 may indicate a meeting associated with contacts R, S, and T. The PDL generator 312 may determine that contacts R, S, and T take super priority over contacts A, B, and C. PDL generator 312 may then generate a priority contact list, based on the contacts associated with the meeting. PDL generator 312 may then make the priority contact list accessible to user 307 via user interface 314.

PDL generator 312 may also be dynamic. Stated another way, PDL generator 312 may continuously update priority based on changes in communication history database 308 and scheduler 310. Based on these changes in priority, PDL generator 312 may continuously and automatically update the prioritized dynamic contact list. In this manner, a user always has the most relevant contacts in a list for accessibility and convenience.

Figure 4:
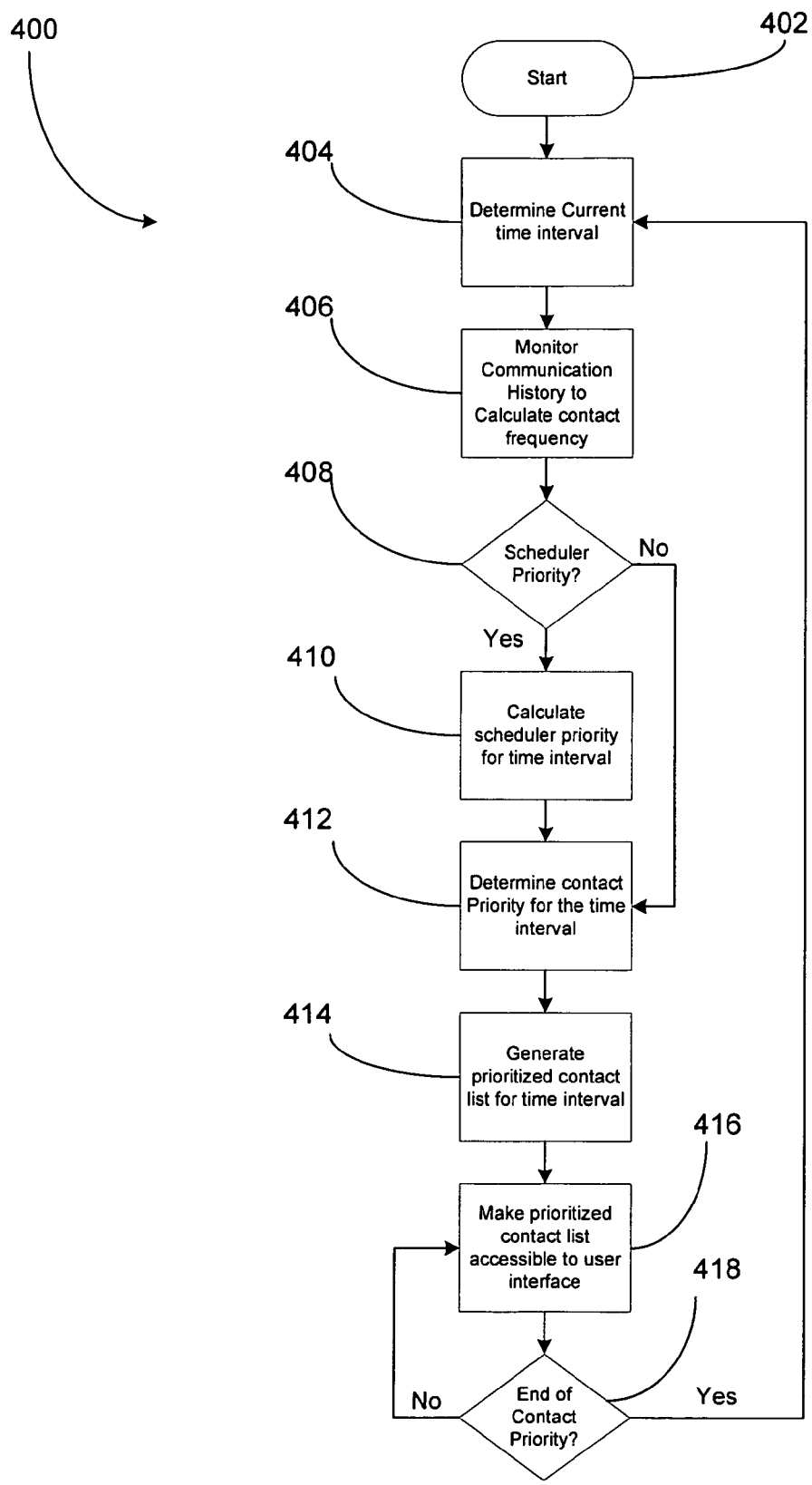
FIG. 4 represents an exemplary logical flow diagram of one embodiment of generating a dynamic prioritized contact list.

FIG. 4 represents a logical flow diagram of one embodiment of generating a dynamic prioritized contact list. Process 400 begins at starting block 402 and continues to block 404 where the current time interval is determined. Block 404 may include a clock that identifies the current time and date. The time interval may be defined by the current time or it may be an increment of time, such as a minute, hour, day, month or year.

Process 400 then flows to monitoring block 406 where a communication history is monitored to determine a contact frequency or pattern for the time interval. The communication history may include a telephone communication history, a cellular telephone communication history, an e-mail communication history, a text messaging communication history, a SMS communication history, a pager communication history or any other type of communication history that may be implemented to facilitate the communication with a contact. The calculated frequency or pattern may include any time interval. For example, the monitored time interval may include the hour of the current time interval, the day of the current time interval, the week of the current time interval, the month of the current time interval or the year of the current time interval. In this manner, hourly, daily, weekly, monthly, or yearly patterns may be identified for the current time interval.

Process 400 then flows to decision block 408 where it is determined if a scheduler receives super priority over the communication history. Scheduler priority may be a preset user-activated option. In this manner a user may choose whether or not a scheduler will receive super priority over the communication history. If no scheduler exists or the scheduler does not receive priority, process 400 flows to block 412 as will be discussed further below.

If the scheduler does receive priority, process 400 flows to block 410 where the scheduler priority for the time interval is calculated. The priority may include the time interval for a meeting or an appointment. In such a situation, the scheduler contacts associated with a particular time interval may receive super priority and displace any priority of the communication history during that time interval. The scheduler contacts may automatically receive super priority over the communication history. In yet another embodiment, the scheduler contacts may receive a weighted priority.

Process 400 flows to block 412 where priority is determined for the current time interval. As stated above, the priority may be based on a contact frequency priority during any number of time intervals. In this manner, hourly patterns, daily patterns, weekly patterns, monthly patterns, or yearly patterns may be identified. In one embodiment, contact frequency priority may be displaced by scheduler priority of a particular interval. In another aspect, the contact frequency priority may be weighted against scheduler priority to determine the optimal priority for a current time interval.

At block 414, the dynamic prioritized contact list is generated for the current time interval. The dynamic prioritized contact list may include a hierarchy of contacts starting with the highest priority and ending with the lowest priority. The dynamic prioritized contact list may also include a sub-set of the highest priority contacts. Such a situation may be beneficial with mobile devices where user interface space, memory and navigability are limited. At block 416, the dynamic prioritized contact list is made accessible to a user via a user interface.

At block 418, system 400 determines if the priority of the contact list has ended. If the priority has not ended, the process returns to block 416 where the dynamic prioritized contact list remains available to the user. If the priority of the contact list has ended, the process returns to block 404 in order to calculate a new dynamic prioritized contact list. The priority of the contact list may end when a time interval ends, when the scheduler priority is finished, when a frequency from the communication history indicates another priority, or for any other reason that indicates that the dynamic prioritized contact list is not optimal.

Illustrative Operating Environment

Figure 1:
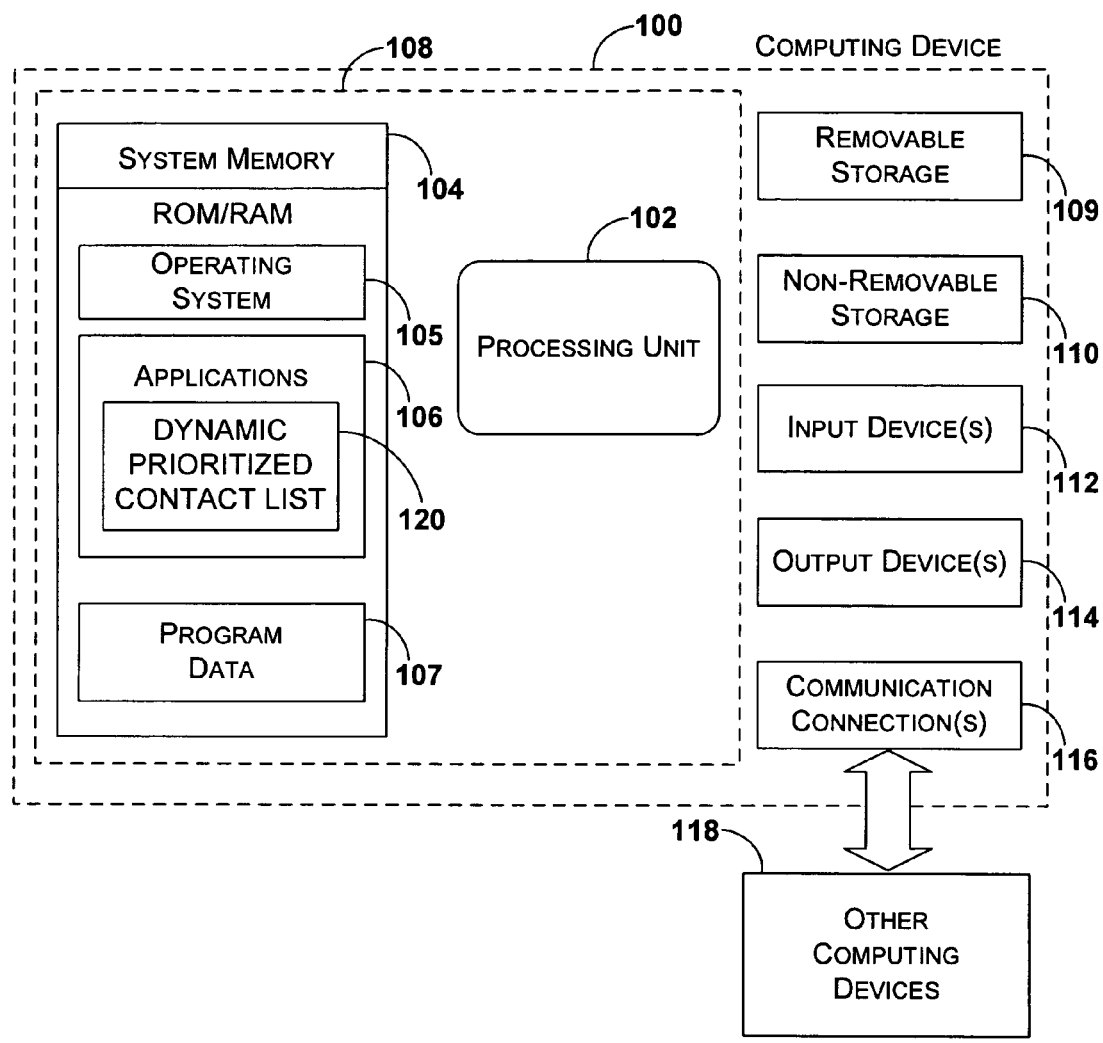
FIG. 1 illustrates an exemplary computing device that may be used in one aspect of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for generating a dynamic prioritized contact list. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
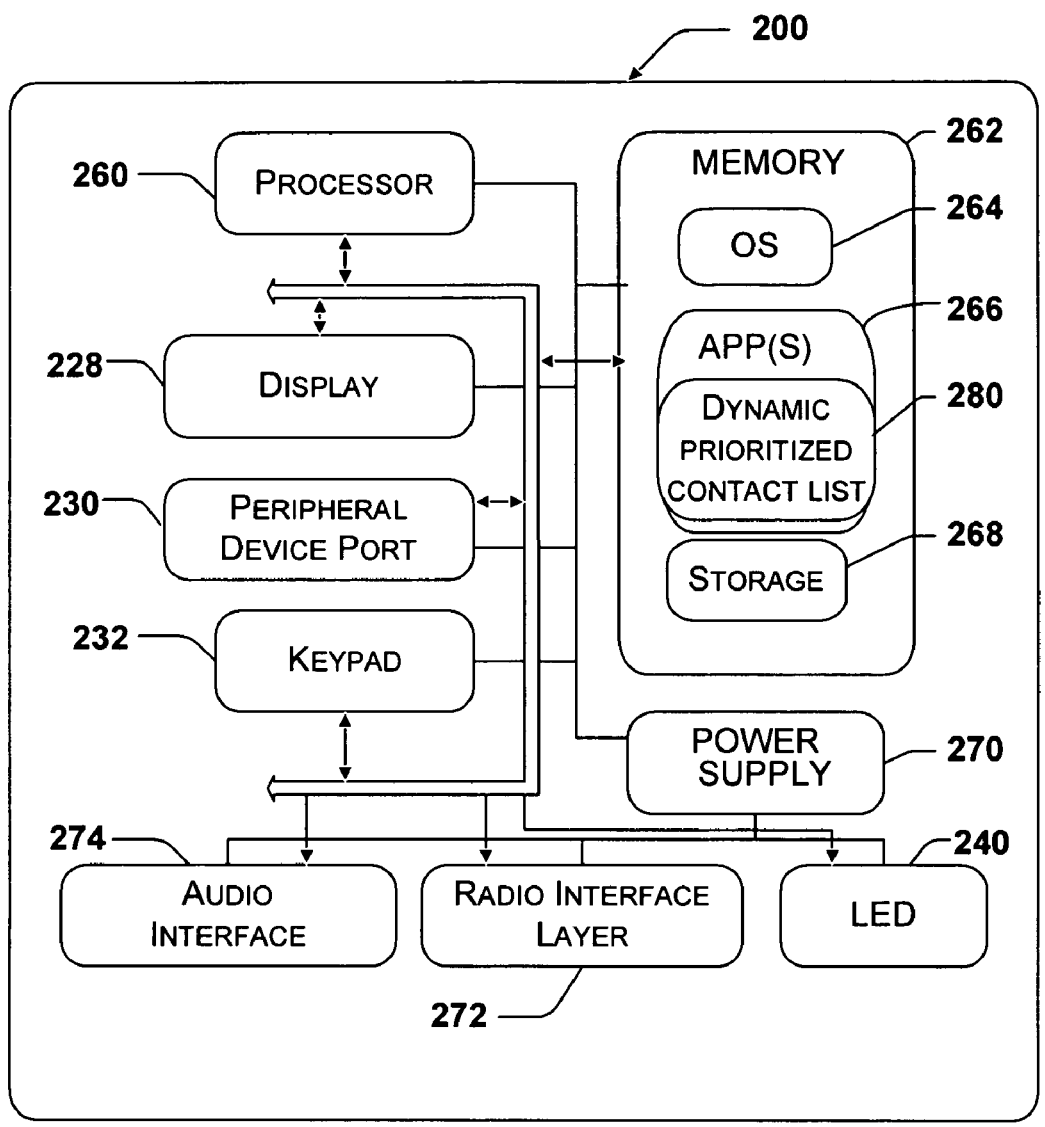
FIG. 2 illustrates an exemplary mobile device that may be used in one aspect of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for generating a dynamic prioritized contact list.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for execution on a computing device for generating a dynamic prioritized contact list, the computer-implemented method comprising:
   determining a current time interval on the computing device;
   accessing a communication history database, wherein the communication history database stores contact frequencies of contact identifiers that occurred in the past;
   determining the contact frequencies of the contact identifiers for past time intervals that correspond to a same time interval of the current time interval;
   causing a processor to prioritize contact identifiers based on the contact frequencies during the past time intervals that correspond to the current time interval, wherein a contact identifier with the greatest contact frequency is indicated with a highest priority; and
   generating a display of a prioritized contact list based on the prioritized contact identifiers determined from the past time intervals.

2. The computer-implemented method of claim 1, wherein determining a current time interval further includes accessing a clock and determining a current time interval from the clock.

3. The computer-implemented method of claim 1, wherein the current time interval includes at least one member of a group comprising: a current time, a current minute, a current hour, a current day, a current week, a current month and a current year.

4. A computer-readable storage memory for generating a dynamic prioritized contact list for a communication device, comprising:
   determining a current time interval of a current day;
   accessing a communication history database, wherein the communication history database stores contact frequencies for past time intervals on the computing device;
   prioritizing contact identifiers based on the contact frequencies during each of the past time intervals that correspond to a same time period of the current time interval, wherein a contact identifier with the greatest contact frequency is indicated with a highest priority; and
   generating the prioritized contact list for the current time interval based on the prioritized contact identifiers determined from the past time intervals.

5. A communication device for providing a dynamic prioritized contact list to a user interface of the communication device, comprising:
   a communication history database configured to store contact identifiers of the communication device in association with a prior contact frequency and in association with a prior time interval;
   an appointment scheduler configured to store an appointment having at least one appointment scheduler contact assigned to the appointment; and
   a prioritized dynamic list generator configured to:
      access a clock to determine a current time interval,
      access the communication history database to determine a plurality of past time intervals that corresponds to the current time interval, each of the past time intervals being a predetermined amount of time,
      determine contact priority based on the prior contact frequency during the plurality of the past time intervals, wherein a contact identifier with the greatest contact frequency is indicated with a highest priority,
      generate a prioritized contact list based on the determined contact priority, wherein the contact identifier with the greatest contact frequency is indicated with the highest priority in the prioritized contact list,
      access the appointment scheduler to determine whether the appointment is within the current time interval; and
      adjust the priority to the at least one appointment scheduler contact assigned to the appointment, when the appointment is within the current time interval.

6. The communication device of claim 5, wherein the communication device includes at least one member of a group comprising: a telephone, a cellular telephone, a satellite telephone, a pager, a desktop computing device, a mobile computing device and a televising device.

7. The communication device of claim 5, wherein the communication includes at least one member of a group comprising: a telephone communication, a cellular telephone communication, an e-mail communication, a text messaging communication, and a Short Messaging Service communication.

8. The computer-implemented method of claim 1, wherein super priority of at least one appointment scheduler contact assigned to an appointment causes the inclusion of the at least one appointment scheduler contact assigned to the appointment in the prioritized contact list, wherein the prioritized contact list includes contacts based on the communication history database.

9. The computer-implemented method of claim 1, wherein super priority of at least one appointment scheduler contact assigned to an appointment causes the inclusion of the at least one appointment scheduler contact assigned to the appointment in the prioritized contact list, wherein the prioritized contact list does not include contacts based on the communication history database.

10. The computer-readable storage memory of claim 4, wherein super priority of at least one appointment scheduler contact assigned to an appointment causes the inclusion of the at least one appointment scheduler contact assigned to the appointment in the prioritized contact list, wherein the prioritized contact list includes contacts based on the communication history database.

11. The computer-readable storage memory of claim 4, wherein super priority of at least one appointment scheduler contact assigned to an appointment causes the inclusion of the at least one appointment scheduler contact assigned to the appointment in the prioritized contact list, wherein the prioritized contact list does not include contacts based on the communication history database.

12. The communication device of claim 5, wherein the indicated super priority of the at least one appointment scheduler contact assigned to the appointment causes the inclusion of the at least one appointment scheduler contact assigned to the appointment in the prioritized contact list, wherein the prioritized contact list includes contacts based on the communication history database.

* * * * *